Nov. 19, 1935.　　　　T. C. WARNER　　　　2,021,275

GAUGE FOR STRIPING INSTRUMENTS

Filed Nov. 1, 1933

INVENTOR.

Thomas C. Warner

BY

ATTORNEY.

Patented Nov. 19, 1935

2,021,275

UNITED STATES PATENT OFFICE 2,021,275

GAUGE FOR STRIPING INSTRUMENTS

Thomas C. Warner, Wichita, Kans.

Application November 1, 1933, Serial No. 696,212

1 Claim. (Cl. 33—36)

My invention relates to a gauge for a striping instrument.

The object of my invention is to provide a gauge attached to and adjustably arranged on a striping instrument.

A further object of my invention is to provide a gauge adaptable to a striping instrument which I have secured a patent on that was issued September 19, 1933, bearing number 1,927,191.

A further object of my invention is to provide a gauge reversibly arranged to accommodate for right and left hand use, or other conditions with respect to the work being striped.

Figure 1:
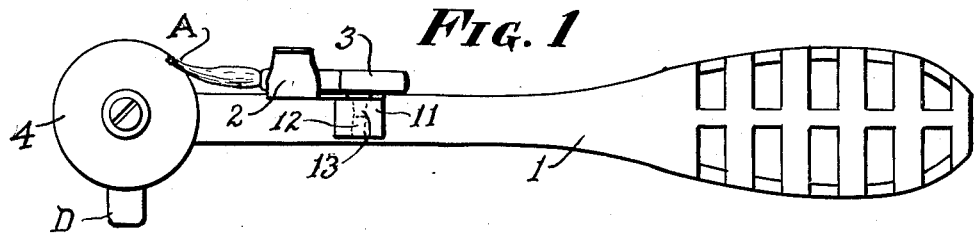
Figure 2:
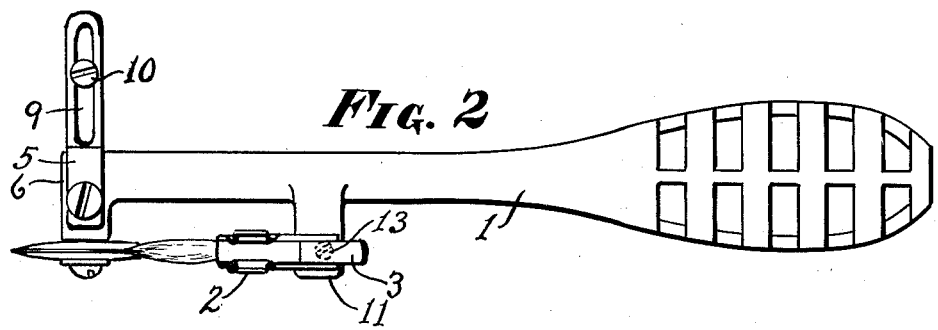
Figure 3:
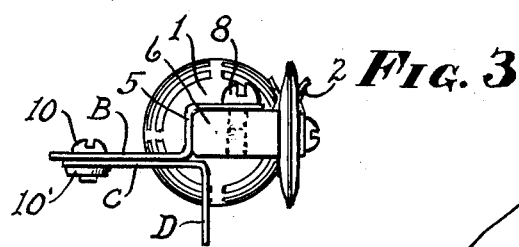
Figure 4:
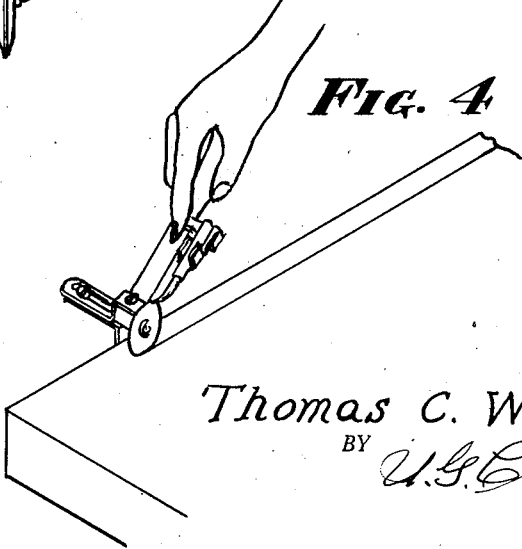

These and other objects will hereinafter be more fully explained, reference being had to the accompanying drawing forming a part of this specification, and in which Figure 1 is a side view of my striping instrument, Figure 2 is a top or plan view of the instrument, showing the gauge in operating position, Figure 3 is a front end view of the instrument and gauge, Figure 4 is a perspective representing one application of the gauge to an element being striped.

In the drawing I have disclosed my striping instrument consisting of a handle, 1, having a clamp, 2, as a carrying means for a brush, 3, and a rotatably arranged wheel, 4, the peripheral edge of which is in contact with the brush, as shown at A in Figures 1 and 2. As a means to space a stripe, I have arranged a bracket, 5, secured to the head, 6, on which the said wheel is trunnioned, the said bracket being secured thereto by a screw, 8, threadedly engaging in the head, the aperture extending therethrough so that the said bracket may be positioned on the upper or lower side of the head. The outwardly extending leg portion, B, has an elongated slot, 9, longitudinally positioned therein, and in which a bolt, 10, will slidably engage, the said bolt being secured to the outer end of one leg of the movable gauge consisting of legs, C and D, positioned at right angles to each other, the leg D being the contact member to slidably engage along the side or edge of a panel being striped as a means to insure parallelism of the stripe to the edge of the panel. The said movable gauge is adapted to slide to and from the wheel when positioned as shown in Figure 3, or it may be rocked on its pivot point in the opposite direction for an extreme extension, and adjustable in the latter described position, and at all times secured rigidly by tightening the nut, 10', that threadedly engages on the said bolt, 10. When the bracket, 5, is reversed by positioning the same on the under side of the head, 6, clamp 2 is also reversible by placing the same on the under side of lug, 11, the said lug having a threaded aperture, 12, extending therethrough and in which screw, 13, will engage as securing means for the clamp. The method of attaching the bracket 5, and securing the gauge element in its selected position may be varied, substituting a wing nut for the screw and bolt shown, and such other modification may be employed as lie within the scope of the appended claim.

Having fully described my invention what I claim is new and desire to secure by Letters Patent is:—

In a gauge for a striping instrument, of the class described consisting of a strip having a right angle bend for one end portion thereof, and another right angle bend in the opposite direction for a portion of the other end, the last said portion having a slot longitudinally positioned therein, all of which constitute a bracket, and means to secure the bracket to the head of a striping instrument, there being a striping wheel trunnioned in the head, a gauge element having a right angle bend spaced from one end thereof and a bolt secured to the other end to engage in the slot slideably there-along, by which means the gauge is stationarily secured in spaced working relation to the wheel for the purpose specified.

THOMAS C. WARNER.